(12) United States Patent
Zhao et al.

(10) Patent No.: US 9,480,047 B2
(45) Date of Patent: Oct. 25, 2016

(54) METHOD FOR PROCESSING SCHEDULING GRANT AND USER EQUIPMENT

(71) Applicant: Huawei Technologies Co., Ltd., Shenzhen (CN)

(72) Inventors: Yueying Zhao, Shanghai (CN); Zongjie Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 14/294,803

(22) Filed: Jun. 3, 2014

(65) Prior Publication Data

US 2014/0269590 A1 Sep. 18, 2014

Related U.S. Application Data

(63) Continuation of application No. PCT/CN2012/086941, filed on Dec. 19, 2012.

(30) Foreign Application Priority Data

Jan. 5, 2012 (CN) .......................... 2012 1 0002211
May 10, 2012 (CN) .......................... 2012 1 0143531

(51) Int. Cl.
*H04W 72/02* (2009.01)
*H04W 72/12* (2009.01)
*H04B 7/06* (2006.01)
(Continued)

(52) U.S. Cl.
CPC ........... *H04W 72/02* (2013.01); *H04B 7/0689* (2013.01); *H04B 7/0697* (2013.01); *H04W 52/146* (2013.01); *H04W 52/16* (2013.01);
(Continued)

(58) Field of Classification Search
CPC .... H04L 1/0045; H04L 1/201; H04W 52/16; H04W 52/34; H04W 52/36; H04W 52/50; H04W 52/52; H04W 52/146; H04W 52/281; H04W 52/286; H04W 52/367; H04W 72/02
See application file for complete search history.

(56) References Cited

U.S. PATENT DOCUMENTS

2005/0030953 A1  2/2005  Vasudevan et al.
2011/0090855 A1  4/2011  Kim
(Continued)

FOREIGN PATENT DOCUMENTS

CN  1855752 A  11/2006
CN  101534176 A  9/2009
(Continued)

OTHER PUBLICATIONS

International Search Report received in PCT/CN2012/086941, mailed Mar. 28, 2013, 12 pages.

*Primary Examiner* — Alpus H Hsu
*Assistant Examiner* — Dharmesh Patel
(74) *Attorney, Agent, or Firm* — Slater Matsil, LLP (57) ABSTRACT

The present invention provides a method for processing a scheduling grant and a UE. In the present invention, a UE determines a sending manner adopted by the UE. If the sending manner is not corresponding to a first grant value obtained by the UE, the UE further determines, according to the first grant value, an obtained primary/secondary stream signal to noise ratio, and an obtained power bias of an E-DPCCH, a second grant value corresponding to the sending manner, so that the UE can determine a length of a to-be-sent data block by using the sending manner and the second grant value.

18 Claims, 1 Drawing Sheet

(51) Int. Cl.
*H04W 52/14* (2009.01)
*H04W 52/16* (2009.01)
*H04W 52/32* (2009.01)
*H04W 52/36* (2009.01)

(52) U.S. Cl.
CPC ......... *H04W52/325* (2013.01); *H04W 52/367* (2013.01); *H04W 72/1268* (2013.01)

(56) References Cited

U.S. PATENT DOCUMENTS

| | | | | |
|---|---|---|---|---|
| 2011/0263281 | A1* | 10/2011 | Cai | H04B 7/0404 455/501 |
| 2012/0099548 | A1 | 4/2012 | Yan et al. | |
| 2012/0120895 | A1 | 5/2012 | Wang et al. | |
| 2012/0177089 | A1* | 7/2012 | Pelletier | H04B 7/0417 375/219 |
| 2013/0058246 | A1 | 3/2013 | Li et al. | |

FOREIGN PATENT DOCUMENTS

| | | |
|---|---|---|
| CN | 101938786 A | 1/2011 |
| CN | 101959238 A | 1/2011 |
| CN | 102244566 A | 11/2011 |
| JP | 1132061 A1 | 2/1999 |
| KR | 1020110043501 A | 4/2011 |
| WO | 2009089760 A1 | 7/2009 |
| WO | WO 2011039134 A1 * | 4/2011 ........... H04L 1/0045 |
| WO | 2011140788 A1 | 11/2011 |

* cited by examiner

METHOD FOR PROCESSING SCHEDULING GRANT AND USER EQUIPMENT

This application is a continuation of International Application No. PCT/CN2012/086941, filed on Dec. 19, 2012, which claims priority to Chinese Patent Application No. 201210002211.X, filed on Jan. 5, 2012 and Chinese Patent Application No. 201210143531.7, filed on May 10, 2012, all of which are hereby incorporated by reference in their entireties.

TECHNICAL FIELD

The present invention relates to communications technologies, and in particular, to a method for processing a scheduling grant and a user equipment (referred to as UE).

BACKGROUND

In multiple antenna transmission of a universal mobile telecommunication system (referred to as UMTS), a base station (NodeB) may indicate, through a rank (rank) indication and a grant value (Grant), a sending manner (namely, rank=1, single-stream sending; and rank=2, dual-stream sending) and maximum sending power corresponding to the sending manner (namely, rank=1, corresponding to maximum sending power of a single stream; and rank=2, corresponding to maximum sending power of a primary stream in a dual stream) to a user equipment (referred to as UE). The UE may determine a length of a to-be-sent data block according to the rank indication and the grant value. Due to a variety of factors, for example, that an update period of the rank indication is shorter than an update period of the grant value, or a sending policy configured by the UE, it is possible that a sending manner adopted by the UE is not corresponding to the grant value indicated by the base station.

However, the prior art does not provide how to determine a length of a to-be-sent data block when a sending manner adopted by a UE is not corresponding to a grant value indicated by a base station.

SUMMARY

The present invention provides a method for processing a scheduling grant and a UE, so that a length of a to-be-sent data block can be determined when a sending manner adopted by a UE is not corresponding to a grant value indicated by a base station.

In one aspect, a method for processing a scheduling grant is provided and includes determining, by a UE, a sending manner adopted by the UE; and if the sending manner is not corresponding to a first grant value obtained by the UE, obtaining, by the UE, according to the first grant value, an obtained primary/secondary stream signal to noise ratio, and an obtained power bias of an E-DPCCH, a second grant value corresponding to the sending manner; and determining, by the UE, a length of a to-be-sent data block by using the sending manner and the second grant value.

In another aspect, a UE is provided and includes a first determining unit, configured to determine a sending manner adopted by the UE; an obtaining unit, configured to, if the sending manner is not corresponding to a first grant value obtained by the UE, obtain, according to the first grant value, an obtained primary/secondary stream signal to noise ratio, and an obtained power bias of an E-DPCCH, a second grant value corresponding to the sending manner; and a second determining unit, configured to determine a length of a to-be-sent data block by using the sending manner and the second grant value.

It can be known from the foregoing technical solutions that, in the embodiments of the present invention, a UE determines a sending manner adopted by the UE. If the sending manner is not corresponding to a first grant value obtained by the UE, the UE further obtains, according to the first grant value, an obtained primary/secondary stream signal to noise ratio, and an obtained power bias of an E-DPCCH, a second grant value corresponding to the sending manner, so that the UE can determine a length of a to-be-sent data block by using the sending manner and the second grant value. It can be ensured that a sending load of the UE does not exceed a target load of a network, and performance of multiple antenna transmission can also be ensured, thereby effectively improving a network throughput.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communications systems, for example, a global system for mobile communications (referred to as GSM), a general packet radio service (referred to as GPRS) system, a code division multiple access (referred to as CDMA) system, a UMTS, a long term evolution (referred to as LTE) system, which is not limited in the present invention.

A base station may be a base station (Base Transceiver Station, referred to as BTS) in a GSM system, a GPRS system, or a CDMA system, may also be a base station (NodeB) in a UMTS, and may also be an evolutional base station (Evolutional Node B, referred to as eNB or eNodeB) in an LTE system, which is not limited in the present invention.

Figure 1:
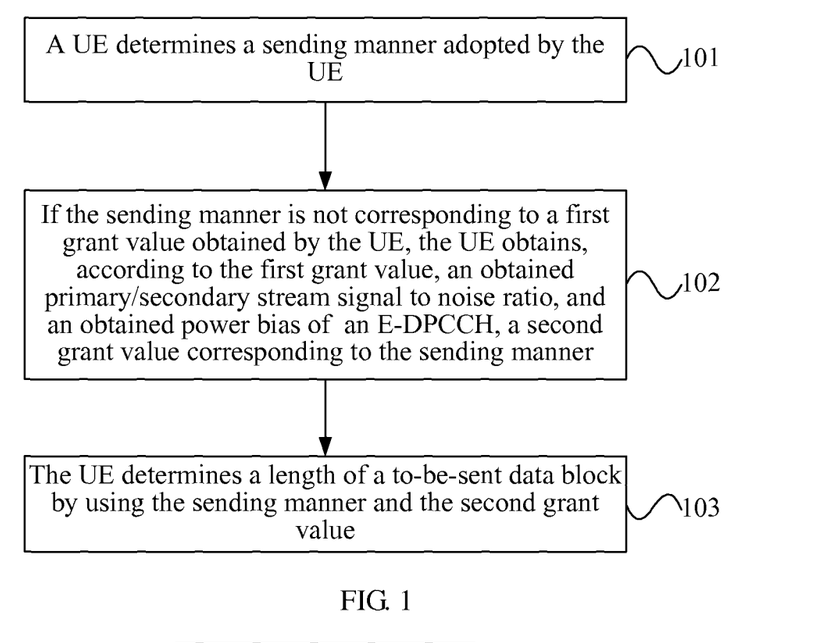
FIG. 1 is a schematic flow chart of a method for processing a scheduling grant according to an embodiment of the present invention.

FIG. 1 is a schematic flow chart of a method for processing a scheduling grant according to an embodiment of the present invention. As shown in FIG. 1, the method for processing a scheduling grant in this embodiment may include:

101: A UE determines a sending manner adopted by the UE.

In an optional implementation manner of this embodiment, the UE may determine, according to a rank indication obtained by the UE, a sending manner indicated by the rank indication as a sending manner adopted by the UE.

In an optional implementation manner of this embodiment, the UE may also determine, according to a rank indication obtained by the UE and a size of to-be-sent data or maximum allowed sending power of the UE, a sending manner adopted by the UE. For example, it is assumed that a base station sends, to the UE, a rank indication indicating a dual-stream sending manner and a grant value corresponding to the rank indication. In this way, if buffering of the UE is limited, which causes that to-be-sent data is relatively less, or that maximum allowed sending power of the UE is less than sending power indicated by the grant value obtained by the UE, the UE may determine that the sending manner adopted by the UE is a single-stream sending manner.

102: If the sending manner is not corresponding to a first grant value obtained by the UE, the UE obtains, according to the first grant value, an obtained primary/secondary stream signal to noise ratio, and an obtained power bias of an enhanced dedicated channel (E-DCH) dedicated physical control channel (referred to as E-DPCCH), a second grant value corresponding to the sending manner.

Optionally, sending periods of the rank indication and the first grant value may be configured separately. For example, the sending period of the rank indication may be configured to three transmission time intervals (referred to as TTI), and the sending period of the first grant value may be configured to eight TTIs. For example, when the base station sends a rank indication or a first grant value, the sending may be performed according to a sending period, where integer multiples of one TTI is used as the sending period, and a rank (rank) value or the first grant value keeps unchanged within the sending period; and the sending may also be performed in only one TTI selected from the sending period and not performed in the other TTIs.

It may be understood that, a primary/secondary stream signal to noise ratio k (namely, k=secondary stream signal to noise ratio/primary stream signal to noise ratio) may also be configured separately. For example, a sending period of the primary/secondary stream signal to noise ratio k may be configured to one TTI. For example, when the base station sends a primary/secondary stream signal to noise ratio k, the sending may be performed according to a sending period, where integer multiples of one TTI is used as the sending period, and the primary/secondary stream signal to noise ratio k keeps unchanged within the sending period; and the sending may also be performed in only one TTI selected from the sending period and not performed in the other TTIs. Further, the primary/secondary stream signal to noise ratio k may also implicitly indicates a rank value. At this time, the sending period of the primary/secondary stream signal to noise ratio k may be taken as a sending period of the rank indication.

In order to make the method provided in this embodiment of the present invention clearer, a UMTS is taken as an example in the following.

In an optional implementation manner of this embodiment, if the UE determines that the sending manner adopted by the UE is a single-stream sending manner, a sending manner corresponding to the first grant value is a dual-stream sending manner, and a secondary E-DPCCH (referred to as S-E-DPCCH) is sent on a secondary stream, in 102, the UE may specifically obtain, according to $$\text{Grant} \leq (1+k) * \left(\frac{\beta_{ed}}{\beta_c}\right)_{dual} + k * \frac{\beta_{ec}}{\beta_c},$$

a grant value range corresponding to the determined sending manner; and then, the UE may further use, according to the grant value range and a quantized value that is used for a scheduling grant, a maximum quantized value in the grant value range as the second grant value $$\left(\frac{\beta_{ed}}{\beta_c}\right)_{single}.$$

Grant represents the grant value range, k represents the primary/secondary stream signal to noise ratio (namely, k=secondary stream signal to noise ratio/primary stream signal to noise ratio);

$$\left(\frac{\beta_{ed}}{\beta_c}\right)_{dual}$$

represents the first grant value, where $\beta_{ed}$ represents power of an E-DCH dedicated physical data channel (referred to as E-DPDCH) or power of a secondary E-DPDCH (referred to as S-E-DPDCH) in the dual-stream sending manner, and $\beta_c$ represents power of a dedicated physical control channel (Dedicated Physical Control Channel, referred to as DPCCH); and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the UE determines that the sending manner adopted by the UE is a single-stream sending manner, a sending manner corresponding to the first grant value is a dual-stream sending manner, and an S-E-DPCCH is sent on a primary stream, in 102, the UE may specifically obtain, according to $$\text{Grant} \leq (1+k) * \left(\frac{\beta_{ed}}{\beta_c}\right)_{dual} + \frac{\beta_{ec}}{\beta_c},$$

a grant value range corresponding to the determined sending manner; and then, the UE may further use, according to the grant value range and a quantized value that is used for a scheduling grant, a maximum quantized value in the grant value range as the second grant value $$\left(\frac{\beta_{ed}}{\beta_c}\right)_{single}.$$

Grant represents the grant value range, and k represents the primary/secondary stream signal to noise ratio;

$$\left(\frac{\beta_{ed}}{\beta_c}\right)_{dual}$$

represents the first grant value, where $\beta_{ed}$ represents power of an E-DPDCH or power of an S-E-DPDCH in the dual-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the UE determines that the sending manner adopted by the UE is a dual-stream sending manner, an S-E-DPCCH is sent on a secondary stream, and a sending manner corresponding to the first grant value is a single-stream sending manner, in 102, the UE may specifically obtain, according to $$\text{Grant} \geq \left(\left(\frac{\beta_{ed}}{\beta_c}\right)_{single} - k * \frac{\beta_{ec}}{\beta_c}\right) / (1+k),$$

a grant value range corresponding to the determined sending manner; and then, the UE may further use, according to the grant value range and a quantized value that is used for a scheduling grant, a minimum quantized value in the grant value range as the second grant value $$\left(\frac{\beta_{ed}}{\beta_c}\right)_{dual}.$$

Grant represents the grant value range, and k represents the primary/secondary stream signal to noise ratio;

$$\left(\frac{\beta_{ed}}{\beta_c}\right)_{single}$$

represents the first grant value, where $\beta_{ed}$ represents power of an E-DPDCH in the single-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the UE determines that the sending manner adopted by the UE is a single-stream sending manner, for example, a rank indicates a single stream or the rank indicates a dual stream, but the UE adopts a single-stream manner for sending due to a case of limited power or limited data, a sending manner corresponding to the first grant value is a dual-stream sending manner, a secondary E-DPCCH (referred to as S-E-DPCCH) is sent on a secondary stream, and power of an E-DPCCH and power of the S-E-DPCCH are set to be different according to a single/dual stream, in an implementation scenario, for example, in step 102, a Grant adopted by the UE to perform sending according to single-stream sending meets the following inequality:

$$\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} \leq \quad (3)$$

$$(1+k)*\left(\frac{\beta_{ed}}{\beta_c}\right)_{dual} + \left(\frac{\beta_{ec,p}}{\beta_c}\right)_{dual} + k*\left(\frac{\beta_{sc}}{\beta_c}\right)_{dual} + k*\left(\frac{\beta_{ec,s}}{\beta_c}\right)_{dual}.$$

That is to say, a Grant for the UE to perform sending in a single-stream manner meets:

$$\left(\frac{\beta_{ed}}{\beta_c}\right)_{single} \leq (1+k)*\left(\frac{\beta_{ed}}{\beta_c}\right)_{dual} + \left(\frac{\beta_{ec,p}}{\beta_c}\right)_{dual} + \quad (4)$$

$$k*\left(\frac{\beta_{sc}}{\beta_c}\right)_{dual} + k*\left(\frac{\beta_{ec,s}}{\beta_c}\right)_{dual} - \left(\frac{\beta_{ec,p}}{\beta_c}\right)_{single} - k*\left(\frac{\beta_{sc}}{\beta_c}\right)_{single}.$$

$$\text{Grant}\left(\left(\frac{\beta_{ed}}{\beta_c}\right)_{single}\right)$$

represents a grant value range. According to the formulas (3) and (4), the UE determines a grant value range corresponding to the sending manner, that is, the single-stream sending manner; and then, the UE may further use, according to the grant value range and a quantized value that is used for a scheduling grant, a maximum quantized value in the grant value range as the second grant value $$\left(\frac{\beta_{ed}}{\beta_c}\right)_{single}.$$

In the formulas (3) and (4), K represents a receiving signal to noise ratio on the premise that sending power of a primary pilot and sending power of a secondary pilot are the same, for example, $$K = \left(\frac{E_{cp}}{N_0}\right)_s \Big/ \left(\frac{E_{cp}}{N_0}\right)_p \cdot \left(\frac{\beta_{ed}}{\beta_c}\right)_{dual}$$

represents a scheduling grant value of a dual stream, where $\beta_{ed}$ represents power of an E-DPDCH or power of an S-E-DPDCH in the dual-stream sending manner, and $\beta_c$ represents power of a DPCCH.

$$\left(\frac{\beta_{ec,p}}{\beta_c}\right)_{dual}$$

represents a power bias of a primary stream control channel E-DPCCH in a dual-stream condition, where $\beta_{ec,p}$ represents power of the primary stream control channel E-DPCCH.

$$\left(\frac{\beta_{sc}}{\beta_c}\right)_{dual}$$

represents a power bias of a secondary pilot channel in the dual-stream condition, where $\beta_{dc}$ represents power of the secondary pilot channel S-DPCCH.

$$\left(\frac{\beta_{ec,s}}{\beta_c}\right)_{dual}$$

represents a power bias of a secondary stream control channel S-E-DPCCH in the dual-stream condition, where $\beta_{ec,s}$ represents power of the secondary stream control channel S-E-DPCCH.

$$\left(\frac{\beta_{ec,p}}{\beta_c}\right)_{single}$$

represents a power bias of the primary stream control channel E-DPCCH in a single-stream condition.

$$\left(\frac{\beta_{sc}}{\beta_c}\right)_{single}$$

represents a power bias of the secondary pilot channel in the single-stream condition.

In another optional implementation manner of this embodiment, if the UE determines that the sending manner adopted by the UE is a single-stream sending manner, for example, a rank indicates a single stream or the rank indicates a dual stream, but the UE adopts a single-stream manner for sending due to a case of limited power or limited data, a sending manner corresponding to the first grant value is a dual-stream sending manner, a secondary E-DPCCH (Secondary E-DPCCH, referred to as S-E-DPCCH) is sent on a primary stream, and power of an E-DPCCH and power of the S-E-DPCCH are set to be different according to a single/dual stream, in an implementation scenario, for example, in step 102, a Grant adopted by the UE to perform sending according to single-stream sending meets the following inequality:

$$\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} \leq \qquad (5)$$
$$(1+k)*\left(\frac{\beta_{ed}}{\beta_c}\right)_{dual} + \left(\frac{\beta_{ec,p}}{\beta_c}\right)_{dual} + k*\left(\frac{\beta_{sc}}{\beta_c}\right)_{dual} + \left(\frac{\beta_{ec,s}}{\beta_c}\right)_{dual}.$$

That is to say, a Grant for the UE to perform sending according to a single stream sending manner meets:

$$\left(\frac{\beta_{ed}}{\beta_c}\right)_{single} \leq (1+k)*\left(\frac{\beta_{ed}}{\beta_c}\right)_{dual} + \left(\frac{\beta_{ec,p}}{\beta_c}\right)_{dual} + \qquad (6)$$
$$k*\left(\frac{\beta_{sc}}{\beta_c}\right)_{dual} + \left(\frac{\beta_{ec,s}}{\beta_c}\right)_{dual} - \left(\frac{\beta_{ec,p}}{\beta_c}\right)_{single} - k*\left(\frac{\beta_{sc}}{\beta_c}\right)_{single}.$$

$$\mathrm{Grant}\left(\left(\frac{\beta_{ed}}{\beta_c}\right)_{single}\right)$$

represents a grant value range. According to the formulas (5) and (6), the UE determines a grant value range corresponding to the sending manner, that is, the single-stream sending manner; and then, the UE may further use, according to the grant value range and a quantized value that is used for a scheduling grant, a maximum quantized value in the grant value range as the second grant value $$\left(\frac{\beta_{ed}}{\beta_c}\right)_{single}.$$

In the formulas (5) and (6), K is defined as a receiving signal to noise ratio on the premise that sending power of a primary pilot and sending power of a secondary pilot are the same, for example, $$K = \left(\frac{E_{cp}}{N_0}\right)_s / \left(\frac{E_{cp}}{N_0}\right)_p \cdot \left(\frac{\beta_{ed}}{\beta_c}\right)_{dual}$$

represents a scheduling grant value of a dual stream, where $\beta_{ed}$ represents power of an E-DPDCH or power of an S-E-DPDCH in the dual-stream sending manner, and $\beta_c$ represents power of a DPCCH; and $$\left(\frac{\beta_{ec,p}}{\beta_c}\right)_{dual}$$

represents a power bias of a primary stream control channel E-DPCCH in a dual-stream condition, where $\beta_{ec,p}$ represents power of the primary stream control channel E-DPCCH.

$$\left(\frac{\beta_{sc}}{\beta_c}\right)_{dual}$$

represents a power bias of a secondary pilot channel in the dual-stream condition, where $\beta_{sc}$ represents power of the secondary pilot channel S-DPCCH.

$$\left(\frac{\beta_{ec,s}}{\beta_c}\right)_{dual}$$

represents a power bias of a secondary stream control channel S-E-DPCCH in the dual-stream condition, where $\beta_{ec,s}$ represents power of the secondary stream control channel S-E-DPCCH.

$$\left(\frac{\beta_{ec,p}}{\beta_c}\right)_{single}$$

represents a power bias of the primary stream control channel E-DPCCH in a single-stream condition.

$$\left(\frac{\beta_{sc}}{\beta_c}\right)_{single}$$

represents a power bias of the secondary pilot channel in the single-stream condition.

In another optional implementation manner of this embodiment, if the UE determines that the sending manner adopted by the UE is a dual-stream sending manner, an S-E-DPCCH is sent on a primary stream, and a sending manner corresponding to the first grant value is a single-stream sending manner, in step 102, the UE may specifically obtain, according to $$\text{Grant} \geq \left(\left(\frac{\beta_{ed}}{\beta_c}\right)_{single} - \frac{\beta_{ec}}{\beta_c}\right) / (1+k),$$

a grant value range corresponding to the determined sending manner; and then, the UE may further use, according to the grant value range and a quantized value that is used for a scheduling grant, a minimum quantized value in the grant value range as the second grant value $$\left(\frac{\beta_{ed}}{\beta_c}\right)_{dual}.$$

Grant represents the grant value range, and k represents the primary/secondary stream signal to noise ratio;

$$\left(\frac{\beta_{ed}}{\beta_c}\right)_{single}$$

represents the first grant value, where $\beta_{ed}$ represents power of an E-DPDCH in the single-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the UE determines that the sending manner adopted by the UE is a dual-stream sending manner, for example, a rank indicates a dual stream, a sending manner corresponding to the first grant value is a single-stream sending manner, and when an S-E-DPCCH is sent on a secondary stream, power of a E-DPCCH and power of the S-E-DPCCH are set to be different according to a single/dual stream, in an implementation scenario, for example, in step 102.

A Grant adopted by the UE to perform sending according to dual-stream sending meets the following inequality:

$$\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} \geq \quad (7)$$

$$(1+k)*\left(\frac{\beta_{ed}}{\beta_c}\right)_{dual} + \left(\frac{\beta_{ec,p}}{\beta_c}\right)_{dual} + k*\left(\frac{\beta_{sc}}{\beta_c}\right)_{dual} + k*\left(\frac{\beta_{ec,s}}{\beta_c}\right)_{dual}.$$

That is to say, a Grant for the UE to perform sending according to a dual stream sending manner meets:

$$\left(\frac{\beta_{ed}}{\beta_c}\right)_{dual} \leq \left(\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} - \quad (8)$$

$$\left(\frac{\beta_{ec,p}}{\beta_c}\right)_{dual} - k*\left(\frac{\beta_{sc}}{\beta_c}\right)_{dual} - k*\left(\frac{\beta_{ec,s}}{\beta_c}\right)_{dual}\right) / (k+1).$$

$$\text{Grant}\left(\left(\frac{\beta_{ec,s}}{\beta_c}\right)_{dual}\right)$$

represents a grant value range. According to the formulas (7) and (8), the UE determines a grant value range corresponding to the sending manner, that is, the dual-stream sending manner; and then, the UE may further use, according to the grant value range and a quantized value that is used for a scheduling grant, a maximum quantized value in the grant value range as the second grant value $$\left(\frac{\beta_{ec,s}}{\beta_c}\right)_{dual}.$$

k represents a receiving signal to noise ratio on the premise that sending power of a primary pilot and a secondary pilot are the same, for example, $$K = \left(\frac{E_{cp}}{N_0}\right)_s / \left(\frac{E_{cp}}{N_0}\right)_p \cdot \left(\frac{\beta_{ed}}{\beta_c}\right)_{single}$$

represents a scheduling grant value of a single stream, where $\beta_{ed}$ represents power of an E-DPDCH in the single-stream sending manner, and $\beta_c$ represents power of a DPCCH; and $$\left(\frac{\beta_{ec,p}}{\beta_c}\right)_{single}$$

represents a power bias of a primary stream control channel E-DPCCH in a single-stream condition, where $\beta_{ec,p}$ represents power of the primary stream control channel E-DPCCH.

$$\left(\frac{\beta_{sc}}{\beta_c}\right)_{single}$$

represents a power bias of a secondary pilot channel in the single-stream condition, where $\beta_{sc}$ represents power of the secondary pilot channel S-DPCCH.

$$\left(\frac{\beta_{ec,p}}{\beta_c}\right)_{dual}$$

represents a power bias of the primary stream control channel E-DPCCH in a dual-stream condition, where $\beta_{ec,p}$ represents the power of the primary stream control channel E-DPCCH.

$$\left(\frac{\beta_{sc}}{\beta_c}\right)_{dual}$$

represents a power bias of the secondary pilot channel S-DPCCH in the dual-stream condition.

$$\left(\frac{\beta_{ec,s}}{\beta_c}\right)_{dual}$$

represents a power bias of a secondary stream control channel S-E-DPCCH in the dual-stream condition.

In another optional implementation manner of this embodiment, if the UE determines that the sending manner adopted by the UE is a dual-stream sending manner, for example, a rank indicates a dual stream, when an S-E-DPCCH is sent on a primary stream, and power of an E-DPCCH and power of the S-E-DPCCH are set to be different according to a single/dual stream, in an implementation scenario, for example, in step 102, a grant adopted by the UE to perform sending according to dual-stream sending meets the following inequality:

$$\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} \geq \quad (9)$$

$$(1+k)*\left(\frac{\beta_{ed}}{\beta_c}\right)_{dual} + \left(\frac{\beta_{ec,p}}{\beta_c}\right)_{dual} + k*\left(\frac{\beta_{sc}}{\beta_c}\right)_{dual} + \left(\frac{\beta_{ec,s}}{\beta_c}\right)_{dual}.$$

That is to say, a Grant for the UE to perform sending according to dual-stream sending meets:

$$\left(\frac{\beta_{ed}}{\beta_c}\right)_{dual} \leq \left(\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} - \right. \quad (10)$$

$$\left. \left(\frac{\beta_{ec,p}}{\beta_c}\right)_{dual} - k*\left(\frac{\beta_{sc}}{\beta_c}\right)_{dual} - \left(\frac{\beta_{ec,s}}{\beta_c}\right)_{dual}\right) / (k+1).$$

$$\text{Grant}\left(\left(\frac{\beta_{ec,s}}{\beta_c}\right)_{dual}\right)$$

represents a grant value range. According to the formulas (9) and (10), the UE determines a grant value range corresponding to the sending manner, that is, the dual-stream sending manner; and then, the UE may further use, according to the grant value range and a quantized value that is used for a scheduling grant, a maximum quantized value in the grant value range as the second grant value $$\left(\frac{\beta_{ec,s}}{\beta_c}\right)_{dual}.$$

In the formulas (9) and (10), k represents a receiving signal to noise ratio on the premise that sending power of a primary pilot and sending power of a secondary pilot are the same, for example, $$K = \left(\frac{E_{cp}}{N_0}\right)_s \bigg/ \left(\frac{E_{cp}}{N_0}\right)_p \cdot \left(\frac{\beta_{ed}}{\beta_c}\right)_{single}$$

represents a scheduling grant value of a single stream, where $\beta_{ed}$ represents power of an E-DPDCH in the single-stream sending manner, and $\beta_c$ represents power of a DPCCH; and $$\left(\frac{\beta_{ec,p}}{\beta_c}\right)_{single}$$

represents a power bias of a primary stream control channel E-DPCCH in a single-stream condition, where $\beta_{ec,p}$ represents power of the primary stream control channel E-DPCCH.

$$\left(\frac{\beta_{sc}}{\beta_c}\right)_{single}$$

represents a power bias of a secondary pilot channel in the single-stream condition, where $\beta_{sc}$ represents power of the secondary pilot channel S-DPCCH.

$$\left(\frac{\beta_{ec,p}}{\beta_c}\right)_{dual}$$

represents a power bias of the primary stream control channel E-DPCCH in a dual-stream condition, where $\beta_{ec,p}$ represents the power of the primary stream control channel E-DPCCH.

$$\left(\frac{\beta_{ec,s}}{\beta_c}\right)_{dual}$$

represents a power bias of a secondary stream control channel S-E-DPCCH in the dual-stream condition.

$$\left(\frac{\beta_{sc}}{\beta_c}\right)_{dual}$$

represents a power bias of the secondary pilot channel in the dual-stream condition.

103: The UE determines a length of a to-be-sent data block by using the sending manner and the second grant value.

In 103, the UE may determine the length of the to-be-sent data block according to formulas corresponding to the sending manner and the second grant value in the prior art. For details, reference may be made to a relevant content in the prior art, which is not described herein again.

In this embodiment, a UE determines a sending manner adopted by the UE. If the sending manner is not corresponding to a first grant value obtained by the UE, the UE further determines, according to the first grant value, an obtained primary/secondary stream signal to noise ratio, and an obtained power bias of an E-DPCCH, a second grant value corresponding to the sending manner, so that the UE can determine a length of a to-be-sent data block by using the sending manner and the second grant value. It can be ensured that a sending load of the UE does not exceed a target load of a network, and performance of multiple antenna transmission can also be ensured, thereby effectively improving a network throughput.

It should be noted that, the foregoing method embodiments are described as a combination of a series of actions for simple description. Persons skilled in the art should know that the present invention is not limited by a sequence of described actions. Based on the present invention, some of the steps may be implemented in another sequence or be synchronously implemented. Secondly, persons skilled in the art should also know that, the embodiments described in the specification all belong to exemplarily embodiments, in which an action and a module involved are not necessarily essential to the present invention.

In the foregoing embodiments, each embodiment is described with a particular emphasis, and for a part that is not described in detail in a certain embodiment, reference may be made to relevant description of another embodiment.

Figure 2:
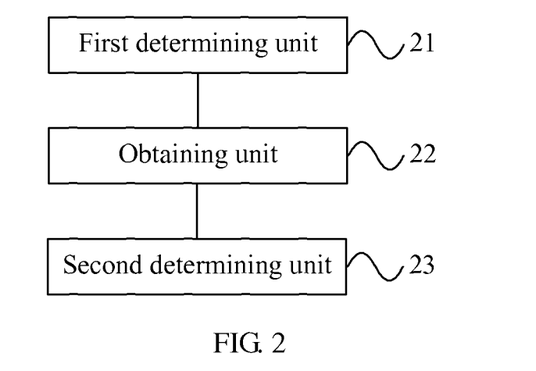
FIG. 2 is a schematic structural diagram of a UE according to another embodiment of the present invention.

FIG. 2 is a schematic structural diagram of a UE according to another embodiment of the present invention. As shown in FIG. 2, the UE in this embodiment includes a first determining unit 21, an obtaining unit 22, and a second determining unit 23. The first determining unit 21 is configured to determine a sending manner adopted by the UE. The obtaining unit 22 is configured to, if the sending manner determined by the first determining unit 21 is not corresponding to a first grant value obtained by the UE, obtain, according to the first grant value, an obtained primary/secondary stream signal to noise ratio, and an obtained power bias of an E-DPCCH, a second grant value corresponding to the sending manner. The second determining unit 23 is configured to determine a length of a to-be-sent data block by using the sending manner and the second grant value.

Functions of the UE in the embodiment corresponding to FIG. 1 can be implemented by the UE provided in this embodiment.

In an optional implementation manner of this embodiment, the first determining unit 21 may specifically determine, according to a rank indication obtained by the UE, a sending manner indicated by the rank indication as a sending manner adopted by the UE.

In an optional implementation manner of this embodiment, the first determining unit 21 may also specifically determine, according to a rank indication obtained by the UE and a size of to-be-sent data or maximum allowed sending power of the UE, a sending manner adopted by the UE. For example, it is assumed that a base station sends, to the UE, a rank indication indicating a dual-stream sending manner and a grant value corresponding to the rank indication. In this way, if buffering of the UE is limited, which causes that to-be-sent data is relatively less, or that maximum allowed sending power of the UE is less than sending power indicated by the grant value obtained by the UE, the first determining unit 21 may determine that the sending manner adopted by the UE is a single-stream sending manner.

In order to make the UE provided in the embodiment of the present invention clearer, a UMTS is taken as an example in the following.

In an optional implementation manner of this embodiment, if the first determining unit 21 determines that the sending manner adopted by the UE is a single-stream sending manner, a sending manner corresponding to the first grant value is a dual-stream sending manner, and an S-E-DPCCH is sent on a secondary stream, the obtaining unit 22 may specifically obtain, according to $$\text{Grant} \leq (1+k) * \left(\frac{\beta_{ed}}{\beta_c}\right)_{dual} + k * \frac{\beta_{ec}}{\beta_c},$$

a grant value range corresponding to the determined sending manner; and then may further use, according to the grant value range and a quantized value that is used for a scheduling grant, a maximum quantized value in the grant value range as the second grant value $$\left(\frac{\beta_{ed}}{\beta_c}\right)_{single}.$$

Grant represents the grant value range, and k represents the primary/secondary stream signal to noise ratio;

$$\left(\frac{\beta_{ed}}{\beta_c}\right)_{single}$$

represents the first grant value, where $\beta_{ed}$ represents power of an E-DPDCH or power of an S-E-DPDCH in the dual-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the first determining unit 21 determines that the sending manner adopted by the UE is a single-stream sending manner, a sending manner corresponding to the first grant value is a dual-stream sending manner, and an S-E-DPCCH is sent on a primary stream, the obtaining unit 22 may specifically obtain, according to $$\text{Grant} \leq (1+k) * \left(\frac{\beta_{ed}}{\beta_c}\right)_{dual} + \frac{\beta_{ec}}{\beta_c},$$

a grant value range corresponding to the determined sending manner; and then may further use, according to the grant value range and a quantized value that is used for a scheduling grant, a maximum quantized value in the grant value range as the second grant value $$\left(\frac{\beta_{ed}}{\beta_c}\right)_{single}.$$

Grant represents the grant value range, and k represents the primary/secondary stream signal to noise ratio;

$$\left(\frac{\beta_{ed}}{\beta_c}\right)_{dual}$$

represents the first grant value, where $\beta_{ed}$ represents power of an E-DPDCH or power of an S-E-DPDCH in the dual-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the first determining unit 21 determines that the sending manner adopted by the UE is a dual-stream sending manner, an S-E-DPCCH is sent on a secondary stream, and a sending manner corresponding to the first grant value is a single-stream sending manner, the obtaining unit 22 may specifically obtain, according to $$\text{Grant} \geq \left(\left(\frac{\beta_{ed}}{\beta_c}\right)_{single} - k*\frac{\beta_{ec}}{\beta_c}\right)/(1+k),$$

a grant value range corresponding to the determined sending manner; and then may further use, according to the grant value range and a quantized value that is used for a scheduling grant, a minimum quantized value in the grant value range as the second grant value $$\left(\frac{\beta_{ed}}{\beta_c}\right)_{dual}.$$

Grant represents the grant value range, and k represents the primary/secondary stream signal to noise ratio;

$$\left(\frac{\beta_{ed}}{\beta_c}\right)_{single}$$

represents the first grant value, where $\beta_{ed}$ represents power of an E-DPDCH in the single-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In another optional implementation manner of this embodiment, if the first determining unit 21 determines that the sending manner adopted by the UE is a dual-stream sending manner, an S-E-DPCCH is sent on a primary stream, and a sending manner corresponding to the first grant value is a single-stream sending manner, the obtaining unit 22 may specifically obtain, according to $$\text{Grant} \geq \left(\left(\frac{\beta_{ed}}{\beta_c}\right)_{single} - \frac{\beta_{ec}}{\beta_c}\right)/(1+k),$$

a grant value range corresponding to the determined sending manner; and then may further use, according to the grant value range and a quantized value that is used for a scheduling grant, a minimum quantized value in the grant value range as the second grant value $$\left(\frac{\beta_{ed}}{\beta_c}\right)_{dual}.$$

Grant represents the grant value range, and k represents the primary/secondary stream signal to noise ratio;

$$\left(\frac{\beta_{ed}}{\beta_c}\right)_{single}$$

represents the first grant value, where $\beta_{ed}$ represents power of an E-DPDCH in the single-stream sending manner, and $\beta_c$ represents power of a DPCCH; and $$\frac{\beta_{ec}}{\beta_c}$$

represents a power bias of the E-DPCCH, where $\beta_{ec}$ represents power of the E-DPCCH, and $\beta_c$ represents the power of the DPCCH.

In this embodiment, a UE determines, through a first determining unit, a sending manner adopted by the UE. If the first determining unit determines that the sending manner is not corresponding to a first grant value obtained by the UE, an obtaining unit further determines, according to the first grant value, an obtained primary/secondary stream signal to noise ratio, and an obtained power bias of an E-DPCCH, a second grant value corresponding to the sending manner, so that a second determining unit can determine a length of a to-be-sent data block by using the sending manner and the second grant value. It can be ensured that a sending load of the UE does not exceed a target load of a network, and performance of multiple antenna transmission can also be ensured, thereby effectively improving a network throughput.

It may be clearly understood by persons skilled in the art that, for the purpose of convenient and brief description, for a detailed working process of the foregoing system, apparatus and unit, reference may be made to a corresponding process in the foregoing method embodiment, which is not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented through hardware, and may also be implemented in the form of hardware plus a software functional unit.

The integrated unit implemented in the form of a software functional unit may be stored in a computer readable storage medium. The software functional unit is stored in a storage medium, which includes several indications used to instruct a computer device (which may be a personal computer, a server, or a network device) to perform the steps of the methods described in the embodiments of the present invention. The storage medium includes: any medium that can store program codes, such as a USB flash disk, a removable hard disk, a read-only memory (Read-Only Memory, referred to as ROM), a random access memory (Random Access Memory, referred to as RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to part of the technical features of the technical solutions, as long as these modifications or replacements do not make the essence of corresponding technical solutions depart from the scope of the technical solutions in the embodiments of the present invention.

What is claimed is:

1. A method for processing a scheduling grant, comprising:
   determining, by a user equipment (UE), a first sending manner adopted by the UE;
   when the first sending manner does not correspond to a first grant value obtained by the UE, obtaining, by the UE, according to the first grant value, an obtained stream signal to noise ratio that is a ratio of a secondary stream signal to noise ratio to a primary stream signal to noise ratio, and an obtained power bias of an enhanced dedicated channel dedicated physical control channel (E-DPCCH), a second grant value corresponding to the first sending manner; and
   determining, by the UE, a length of a to-be-sent data block by using the first sending manner and the second grant value;
   wherein the UE determines that the first sending manner adopted by the UE is a single-stream sending manner, a second sending manner corresponding to the first grant value is a dual-stream sending manner, and a secondary enhanced dedicated channel dedicated physical control channel (S-E-DPCCH) is sent on the secondary stream; and
   wherein the obtaining, by the UE, according to the first grant value, the obtained stream signal to noise ratio, and the obtained power bias of an E-DPCCH, the second grant value corresponding to the first sending manner comprises:
   obtaining, by the UE, according to $$\text{Grant} \leq (1+k) * \left(\frac{\beta_{ed}}{\beta_c}\right)_{dual} + k * \frac{\beta_{ec}}{\beta_c},$$

a grant value range corresponding to the determined first sending manner; and
   using, by the UE, according to the grant value range and a quantized value that is used for the scheduling grant, a maximum quantized value in the grant value range as the second grant value $$\left(\frac{\beta_{ed}}{\beta_c}\right)_{single};$$

wherein, Grant represents the grant value range, and k is a value greater than zero that represents the obtained stream signal to noise ratio, wherein $$\left(\frac{\beta_{ed}}{\beta_c}\right)_{dual}$$

represents the first grant value, wherein $\beta_{ed}$ represents power of an enhanced dedicated channel dedicated physical control channel (E-DPDCH) or power of a secondary E-DPDCH (S-E-DPDCH) in the dual-stream sending manner, and $\beta_c$ represents power of a dedicated physical control channel (DPCCH), and wherein $$\frac{\beta_{ec}}{\beta_c}$$

represents the power bias of the E-DPCCH, wherein $\beta_{ec}$ represents the power of the E-DPCCH, and $\beta_c$ represents the power of the DPCCH.

2. The method according to claim 1, wherein the determining, by the UE, the first sending manner adopted by the UE comprises:
   determining, by the UE, according to a rank indication obtained by the UE, a third sending manner indicated by the rank indication as the first sending manner adopted by the UE; or
   determining, by the UE, according to the rank indication obtained by the UE and a size of to-be-sent data; or
   determining, by the UE, according to the rank indication obtained by the UE and a maximum allowed sending power of the UE, the first sending manner adopted by the UE.

3. The method according to claim 2, wherein sending periods of the rank indication and the first grant value are configured separately.

4. The method according to claim 1, wherein the UE determines that the first sending manner adopted by the UE is the single-stream sending manner, the second sending manner corresponding to the first grant value is the dual-stream sending manner, and the S-E-DPCCH is sent on the primary stream, and wherein the obtaining, by the UE, according to the first grant value, the obtained stream signal to noise ratio, and the obtained power bias of an E-DPCCH, the second grant value corresponding to the first sending manner comprises:

obtaining, by the UE, according to $$\text{Grant} \leq (1+k) * \left(\frac{\beta_{ed}}{\beta_c}\right)_{dual} + \frac{\beta_{ec}}{\beta_c},$$

the grant value range corresponding to the determined first sending manner; and using, by the UE, according to the grant value range and the quantized value that is used for the scheduling grant, the maximum quantized value in the grant value range as the second grant value $$\left(\frac{\beta_{ed}}{\beta_c}\right)_{single};$$

wherein, Grant represents the grant value range, and k is a value greater than zero that represents the obtained stream signal to noise ratio;

$$\left(\frac{\beta_{ed}}{\beta_c}\right)_{dual}$$

represents the first grant value, wherein $\beta_{ed}$ represents power of the E-DPDCH or power of the S-E-DPDCH in the dual-stream sending manner, and $\beta_c$ represents the power of the DPCCH; and $$\frac{\beta_{ec}}{\beta_c}$$

represents the power bias of the E-DPCCH, wherein $\beta_{ec}$ represents the power of the E-DPCCH, and $\beta_c$ represents the power of the DPCCH.

5. The method according to claim 1, wherein the UE determines that the first sending manner adopted by the UE is the single-stream sending manner, the second sending manner corresponding to the first grant value is the dual-stream sending manner, and the S-E-DPCCH is sent on the secondary stream; and wherein the obtaining, by the UE, according to the first grant value, the obtained stream signal to noise ratio, and the obtained power bias of the E-DPCCH, the second grant value corresponding to the first sending manner comprises:

obtaining, by the UE, according to a formula, $$\left(\frac{\beta_{ed}}{\beta_c}\right)_{single} \leq (1+k) * \left(\frac{\beta_{ed}}{\beta_c}\right)_{dual} + \left(\frac{\beta_{ec,p}}{\beta_c}\right)_{dual} + k * \left(\frac{\beta_{sc}}{\beta_c}\right)_{dual} + k * \left(\frac{\beta_{ec,s}}{\beta_c}\right)_{dual} - \left(\frac{\beta_{ec,p}}{\beta_c}\right)_{single} - k * \left(\frac{\beta_{sc}}{\beta_c}\right)_{single},$$

the grant value range corresponding to the determined sending manner; and using, by the UE, according to the grant value range and the quantized value that is used for the scheduling grant, the maximum quantized value in the grant value range as the second grant value $$\left(\frac{\beta_{ed}}{\beta_c}\right)_{single};$$

wherein, k is a value greater than zero that represents the obtained stream signal to noise ratio;

$$\left(\frac{\beta_{ed}}{\beta_c}\right)_{dual}$$

represents a scheduling grant value of a dual stream, wherein $\beta_{ed}$ represents the power of the E-DPDCH or the power of the S-E-DPDCH in the dual-stream sending manner, and $\beta_c$ represents the power of the DPCCH;

$$\left(\frac{\beta_{ec,p}}{\beta_c}\right)_{dual}$$

represents a power bias of a primary stream control channel E-DPCCH in a dual-stream condition, wherein $\beta_{ec,p}$ represents a power of the primary stream control channel E-DPCCH;

$$\left(\frac{\beta_{sc}}{\beta_c}\right)_{dual}$$

represents a power bias of a secondary pilot channel in the dual-stream condition, wherein $\beta_{sc}$ represents power of a secondary pilot channel secondary DPCCH (S-DPCCH);

$$\left(\frac{\beta_{ec,s}}{\beta_c}\right)_{dual}$$

represents a power bias of a secondary stream control channel S-E-DPCCH in the dual-stream condition, wherein $\beta_{ec,s}$ represents power of the secondary stream control channel S-E-DPCCH;

$$\left(\frac{\beta_{ec,p}}{\beta_c}\right)_{single}$$

represents a power bias of the primary stream control channel E-DPCCH in a single-stream condition; and $$\left(\frac{\beta_{sc}}{\beta_c}\right)_{single}$$

represents a power bias of the secondary pilot channel in the single-stream condition.

6. The method according to claim 1, wherein the UE determines that the first sending manner adopted by the UE is the single-stream sending manner, the second sending manner corresponding to the first grant value is the dual-stream sending manner, and the S-E-DPCCH is sent on the primary stream; and wherein the obtaining, by the UE, according to the first grant value, the obtained stream signal to noise ratio, and the obtained power bias of the E-DPCCH, the second grant value corresponding to the first sending manner comprises:

obtaining, by the UE, according to a formula, $$\left(\frac{\beta_{ed}}{\beta_c}\right)_{single} \leq (1+k) * \left(\frac{\beta_{ed}}{\beta_c}\right)_{dual} + \left(\frac{\beta_{ec,p}}{\beta_c}\right)_{dual} + k*\left(\frac{\beta_{sc}}{\beta_c}\right)_{dual} + \left(\frac{\beta_{ec,s}}{\beta_c}\right)_{dual} - \left(\frac{\beta_{ec,p}}{\beta_c}\right)_{single} - k*\left(\frac{\beta_{sc}}{\beta_c}\right)_{single},$$

the grant value range corresponding to the determined first sending manner; and using, by the UE, according to the grant value range and the quantized value that is used for the scheduling grant, the maximum quantized value in the grant value range as the second grant value $$\left(\frac{\beta_{ed}}{\beta_c}\right)_{single};$$

wherein, k is a value greater than zero that represents the obtained stream signal to noise ratio;

$$\left(\frac{\beta_{ed}}{\beta_c}\right)_{dual}$$

represents a scheduling grant value of a dual stream, wherein $\beta_{ed}$ represents the power of the E-DPDCH or the power of the S-E-DPDCH in the dual-stream sending manner, and $\beta_c$ represents the power of the DPCCH;

$$\left(\frac{\beta_{ec,p}}{\beta_c}\right)_{dual}$$

represents a power bias of a primary stream control channel E-DPCCH in a dual-stream condition, wherein $\beta_{ec,p}$ represents a power of the primary stream control channel E-DPCCH;

$$\left(\frac{\beta_{sc}}{\beta_c}\right)_{dual}$$

represents a power bias of a secondary pilot channel in the dual-stream condition, wherein $\beta_{sc}$ represents a power of a secondary pilot channel secondary DPCCH (S-DPCCH);

$$\left(\frac{\beta_{ec,s}}{\beta_c}\right)_{dual}$$

represents a power bias of a secondary stream control channel S-E-DPCCH in the dual-stream condition, wherein $\beta_{ec,s}$ represents a power of the secondary stream control channel S-E-DPCCH;

$$\left(\frac{\beta_{ec,p}}{\beta_c}\right)_{single}$$

represents a power bias of the primary stream control channel E-DPCCH in a single-stream condition; and $$\left(\frac{\beta_{sc}}{\beta_c}\right)_{single}$$

represents a power bias of the secondary pilot channel in the single-stream condition.

7. The method according to claim 1, wherein the UE determines that the first sending manner adopted by the UE is the dual-stream sending manner, the S-E-DPCCH is sent on the secondary stream, and the second sending manner corresponding to the first grant value is the single-stream sending manner; and wherein the obtaining, by the UE, according to the first grant value, the obtained stream signal to noise ratio, and the obtained power bias of the E-DPCCH, the second grant value corresponding to the first sending manner comprises:

obtaining, by the UE, according to $$\text{Grant} \geq \left(\left(\frac{\beta_{ed}}{\beta_c}\right)_{single} - k*\frac{\beta_{ec}}{\beta_c}\right)/(1+k),$$

the grant value range corresponding to the determined first sending manner; and using, by the UE, according to the grant value range and the quantized value that is used for the scheduling grant, a minimum quantized value in the grant value range as the second grant value $$\left(\frac{\beta_{ed}}{\beta_c}\right)_{dual};$$

wherein, Grant represents the grant value range, and k is a value greater than zero that represents the obtained stream signal to noise ratio;

$$\left(\frac{\beta_{ed}}{\beta_c}\right)_{single}$$

represents the first grant value, wherein $\beta_{ed}$ represents a power of an E-DPDCH in the single-stream sending manner, and $\beta_c$ represents power of a DPCCH; and $$\frac{\beta_{ec}}{\beta_c}$$

represents a power bias of the E-DPCCH, wherein $\beta_{ec}$ represents power of the E-DPCCH, and $\beta_c$ represents the power of the DPCCH.

8. The method according to claim 1, wherein the UE determines that the first sending manner adopted by the UE is the dual-stream sending manner, the S-E-DPCCH is sent on the primary stream, and the second sending manner corresponding to the first grant value is the single-stream sending manner; and
  wherein the obtaining, by the UE, according to the first grant value, the obtained stream signal to noise ratio, and the obtained power bias of the E-DPCCH, the second grant value corresponding to the sending manner comprises:
  obtaining, by the UE, according to $$\mathrm{Grant} \geq \left(\left(\frac{\beta_{ed}}{\beta_c}\right)_{single} - \frac{\beta_{ec}}{\beta_c}\right)/(1+k),$$

the grant value range corresponding to the determined sending manner; and
using, by the UE, according to the grant value range and the quantized value that is used for the scheduling grant, a minimum quantized value in the grant value range as the second grant value $$\left(\frac{\beta_{ed}}{\beta_c}\right)_{dual};$$

wherein, Grant represents the grant value range, and k is a value greater than zero that represents the obtained stream signal to noise ratio;

$$\left(\frac{\beta_{ed}}{\beta_c}\right)_{single}$$

represents the first grant value, wherein $\beta_{ed}$ represents the power of the E-DPDCH in the single-stream sending manner, and $\beta_c$ represents the power of the DPCCH; and $$\frac{\beta_{ec}}{\beta_c}$$

represents the power bias of the E-DPCCH, wherein $\beta_{ec}$ represents the power of the E-DPCCH, and $\beta_c$ represents the power of the DPCCH.

9. The method according to claim 1, wherein the UE determines that the first sending manner adopted by the UE is the dual-stream sending manner, the S-E-DPCCH is sent on the secondary stream, and the second sending manner corresponding to the first grant value is the single-stream sending manner; and
  wherein the obtaining, by the UE, according to the first grant value, the obtained stream signal to noise ratio, and the obtained power bias of the E-DPCCH, the second grant value corresponding to the first sending manner comprises:
  obtaining, by the UE, according to a formula, $$\left(\frac{\beta_{ed}}{\beta_c}\right)_{dual} \leq \left(\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} - \left(\frac{\beta_{ec,p}}{\beta_c}\right)_{dual} - k*\left(\frac{\beta_{sc}}{\beta_c}\right)_{dual} - k*\left(\frac{\beta_{ec,s}}{\beta_c}\right)_{dual}\right)/(k+1),$$

the grant value range corresponding to the determined sending manner; and
using, by the UE, according to the grant value range and the quantized value that is used for the scheduling grant, a minimum quantized value in the grant value range as the second grant value $$\left(\frac{\beta_{ed}}{\beta_c}\right)_{dual};$$

wherein, k is a value greater than zero that represents the obtained stream signal to noise ratio;

$$\left(\frac{\beta_{ed}}{\beta_c}\right)_{single}$$

represents a scheduling grant value of a single stream, wherein $\beta_{ed}$ represents the power of the E-DPDCH; in the single-stream sending manner, and $\beta_c$ represents power of the DPCCH;

$$\left(\frac{\beta_{ec,p}}{\beta_c}\right)_{single}$$

represents a power bias of a primary stream control channel E-DPCCH in a single-stream condition, wherein $\beta_{ec,p}$ represents power of the primary stream control channel E-DPCCH;

$$\left(\frac{\beta_{sc}}{\beta_c}\right)_{single}$$

represents a power bias of a secondary pilot channel in the single-stream condition, wherein $\beta_{sc}$ represents power of a secondary pilot channel secondary DPCCH (S-DPCCH);

$$\left(\frac{\beta_{ec,p}}{\beta_c}\right)_{dual}$$

represents a power bias of the primary stream control channel E-DPCCH in a dual-stream condition, wherein $\beta_{ec,p}$ represents the power of the primary stream control channel E-DPCCH;

$$\left(\frac{\beta_{sc}}{\beta_c}\right)_{dual}$$

represents a power bias of a secondary pilot channel S-DPCCH in the dual-stream condition; and $$\left(\frac{\beta_{ec,s}}{\beta_c}\right)_{dual}$$

represents a power bias of a secondary stream control channel S-E-DPCCH in the dual-stream condition.

10. The method according to claim 1, wherein the UE determines that the first sending manner adopted by the UE is the dual-stream sending manner, the S-E-DPCCH is sent on the primary stream, and the second sending manner corresponding to the first grant value is the single-stream sending manner; and wherein the obtaining, by the UE, according to the first grant value, the obtained stream signal to noise ratio, and the obtained power bias of the E-DPCCH, the second grant value corresponding to the sending manner comprises:

obtaining, by the UE, according to a formula, $$\left(\frac{\beta_{ed}}{\beta_c}\right)_{dual} \leq \left(\left(\frac{\beta_{ed}}{\beta_c}\right)_{single} + \left(\frac{\beta_{ec,p}}{\beta_c}\right)_{single} + k*\left(\frac{\beta_{sc}}{\beta_c}\right)_{single} - \left(\frac{\beta_{ec,p}}{\beta_c}\right)_{dual} - k*\left(\frac{\beta_{sc}}{\beta_c}\right)_{dual} - \left(\frac{\beta_{ec,s}}{\beta_c}\right)_{dual}\right) / (k+1),$$

the grant value range corresponding to the determined sending manner; and using, by the UE, according to the grant value range and the quantized value that is used for the scheduling grant, a minimum quantized value in the grant value range as the second grant value $$\left(\frac{\beta_{ed}}{\beta_c}\right)_{dual};$$

wherein, k is a value greater than zero that represents the obtained stream signal to noise ratio;

$$\left(\frac{\beta_{ed}}{\beta_c}\right)_{single}$$

represents a scheduling grant value of a single stream, wherein $\beta_{ed}$ represents the power of the E-DPDCH in the single-stream sending manner, and $\beta_c$ represents the power of the DPCCH;

$$\left(\frac{\beta_{ec,p}}{\beta_c}\right)_{single}$$

represents a power bias of a primary stream control channel E-DPCCH in a single-stream condition, wherein $\beta_{ec,p}$ represents a power of the primary stream control channel E-DPCCH;

$$\left(\frac{\beta_{sc}}{\beta_c}\right)_{single}$$

represents a power bias of a secondary pilot channel in the single-stream condition, wherein $\beta_{sc}$ represents power of a secondary pilot channel secondary DPCCH (S-DPCCH);

$$\left(\frac{\beta_{ec,p}}{\beta_c}\right)_{dual}$$

represents a power bias of the primary stream control channel E-DPCCH in a dual-stream condition, wherein $\beta_{ec,p}$ represents the power of the primary stream control channel E-DPCCH;

$$\left(\frac{\beta_{ec,s}}{\beta_c}\right)_{dual}$$

represents a power bias of a secondary stream control channel S-E-DPCCH in the dual-stream condition; and $$\left(\frac{\beta_{sc}}{\beta_c}\right)_{dual}$$

represents a power bias of the secondary pilot channel in the dual-stream condition.

11. A user equipment (UE), comprising:
a processor; and
a non-transitory computer-readable storage medium storing a program to be executed by the processor, the program including instructions to:
determine a first sending manner adopted by the UE;
when the first sending manner does not correspond to a first grant value obtained by the UE, obtain, according to the first grant value, an obtained stream signal to noise ratio that is a ratio of a secondary stream signal to noise ratio to a primary stream signal to noise ratio, and an obtained power bias of an enhanced dedicated channel dedicated physical control channel (E-DPCCH), a second grant value corresponding to the first sending manner; and
determine a length of a to-be-sent data block by using the first sending manner and the second grant value;
wherein the instructions to determine the first sending manner include instructions to determine that the first sending manner adopted by the UE is a single-stream sending manner, wherein a second sending manner corresponding to the first grant value is a dual-stream sending manner, and wherein a secondary enhanced dedicated channel dedicated physical control channel (S-E-DPCCH) is sent on a secondary stream; and
wherein the instructions to obtain the second grant value corresponding to the first sending manner includes instructions to:
according to $$\text{Grant} \leq (1+k)*\left(\frac{\beta_{ed}}{\beta_c}\right)_{dual} + k*\frac{\beta_{ec}}{\beta_c},$$

obtain a grant value range corresponding to the determined first sending manner; and according to the grant value range and a quantized value that is used for a scheduling grant, use a maximum quantized value in the grant value range as the second grant value $$\left(\frac{\beta_{ed}}{\beta_c}\right)_{single};$$

wherein, Grant represents the grant value range, and k is a value greater than zero that represents the obtained stream signal to noise ratio, wherein $$\left(\frac{\beta_{ed}}{\beta_c}\right)_{dual}$$

represents the first grant value, wherein $\beta_{ed}$ represents a power of an enhanced dedicated channel dedicated physical control channel (E-DPDCH) or a power of an secondary E-DPDCH (S-E-DPDCH) in the dual-stream sending manner, and $\beta_c$ represents a power of a dedicated physical control channel (DPCCH), and wherein $$\frac{\beta_{ec}}{\beta_c}$$

represents a power bias of the E-DPCCH, wherein $\beta_{ec}$ represents a power of the E-DPCCH, and $\beta_c$ represents the power of the DPCCH.

12. The UE according to claim 11, wherein the instructions to determine the first sending manner include instructions to perform at least one of:
according to a rank indication obtained by the UE, determine a third sending manner indicated by the rank indication as the first sending manner adopted by the UE; or
according to the rank indication obtained by the UE and a size of to-be-sent data, determine the first sending manner adopted by the UE; or
according to the rank indication obtained by the UE and a maximum allowed sending power of the UE, determine the first sending manner adopted by the UE.

13. The UE according to claim 12, wherein sending periods of the rank indication and the first grant value are configured separately.

14. The UE according to claim 11, wherein the instructions to determine the first sending manner include instructions to determine that the first sending manner adopted by the UE is the single-stream sending manner, wherein the second sending manner corresponding to the first grant value is the dual-stream sending manner, and wherein the S-E-DPCCH is sent on the primary stream; and
wherein the instructions to obtain the second grant value corresponding to the sending manner includes instructions to:
according to $$\text{Grant} \leq (1+k) * \left(\frac{\beta_{ed}}{\beta_c}\right)_{dual} + \frac{\beta_{ec}}{\beta_c},$$

obtain the grant value range corresponding to the determined first sending manner; and according to the grant value range and the quantized value that is used for the scheduling grant, use the maximum quantized value in the grant value range as the second grant value $$\left(\frac{\beta_{ed}}{\beta_c}\right)_{single};$$

wherein, Grant represents the grant value range, and k is a value greater than zero that represents the obtained stream signal to noise ratio;

$$\left(\frac{\beta_{ed}}{\beta_c}\right)_{dual}$$

represents the first grant value, wherein $\beta_{ed}$ represents power of an E-DPDCH or power of an S-E-DPDCH in the dual-stream sending manner, and $\beta_c$ represents power of a DPCCH; and $$\frac{\beta_{ec}}{\beta_c}$$

represents a power bias of the E-DPCCH, wherein $\beta_{ec}$ represents power of the E-DPCCH, and $\beta_c$ represents the power of the DPCCH.

15. The UE according to claim 11, wherein the instructions to determine the first sending manner include instructions to determine that the first sending manner adopted by the UE is the single-stream sending manner, wherein the second sending manner corresponding to the first grant value is the dual-stream sending manner, and wherein the S-E-DPCCH is sent on the secondary stream; and
wherein the instructions to obtain the second grant value corresponding to the first sending manner includes instructions to:
according to a formula, $$\left(\frac{\beta_{ed}}{\beta_c}\right)_{single} \leq (1+k) * \left(\frac{\beta_{ed}}{\beta_c}\right)_{dual} + \left(\frac{\beta_{ec,p}}{\beta_c}\right)_{dual} + k * \left(\frac{\beta_{sc}}{\beta_c}\right)_{dual} + k * \left(\frac{\beta_{ec,s}}{\beta_c}\right)_{dual} - \left(\frac{\beta_{ec,p}}{\beta_c}\right)_{single} - k * \left(\frac{\beta_{sc}}{\beta_c}\right)_{single},$$

obtain the grant value range corresponding to the determined first sending manner; and according to the grant value range and the quantized value that is used for the scheduling grant, use the maximum quantized value in the grant value range as the second grant value $$\left(\frac{\beta_{ed}}{\beta_c}\right)_{single};$$

wherein, k is a value greater than zero that represents the obtained stream signal to noise ratio;

$$\left(\frac{\beta_{ed}}{\beta_c}\right)_{dual}$$

represents a scheduling grant value of a dual stream, wherein $\beta_{ed}$ represents the power of the E-DPDCH or the power of the S-E-DPDCH in the dual-stream sending manner, and $\beta_c$ represents the power of the DPCCH;

$$\left(\frac{\beta_{ec,p}}{\beta_c}\right)_{dual}$$

represents a power bias of a primary stream control channel E-DPCCH in a dual-stream condition, wherein $\beta_{ec,p}$ represents a power of the primary stream control channel E-DPCCH;

$$\left(\frac{\beta_{sc}}{\beta_c}\right)_{dual}$$

represents a power bias of a secondary pilot channel in the dual-stream condition, wherein $\beta_{sc}$ represents a power of a secondary pilot channel secondary DPCCH (S-DPCCH);

$$\left(\frac{\beta_{ec,s}}{\beta_c}\right)_{dual}$$

represents a power bias of a secondary stream control channel S-E-DPCCH in the dual-stream condition, wherein $\beta_{ec,s}$ represents a power of the secondary stream control channel S-E-DPCCH;

$$\left(\frac{\beta_{ec,p}}{\beta_c}\right)_{single}$$

represents a power bias of the primary stream control channel E-DPCCH in a single-stream condition; and $$\left(\frac{\beta_{sc}}{\beta_c}\right)_{single}$$

represents a power bias of the secondary pilot channel in the single-stream condition.

16. The UE according to claim 11, wherein the instructions to determine the first sending manner include instructions to determine that the first sending manner adopted by the UE is the single-stream sending manner, wherein the second sending manner corresponding to the first grant value is the dual-stream sending manner, and wherein the S-E-DPCCH is sent on the primary stream; and
wherein the instructions to obtain the second grant value corresponding to the first sending manner includes instructions to:
according to a formula, $$\left(\frac{\beta_{ed}}{\beta_c}\right)_{single} \leq (1+k)*\left(\frac{\beta_{ed}}{\beta_c}\right)_{dual} + \left(\frac{\beta_{ec,p}}{\beta_c}\right)_{dual} +$$

$$k*\left(\frac{\beta_{sc}}{\beta_c}\right)_{dual} + \left(\frac{\beta_{ec,s}}{\beta_c}\right)_{dual} - \left(\frac{\beta_{ec,p}}{\beta_c}\right)_{single} - k*\left(\frac{\beta_{sc}}{\beta_c}\right)_{single},$$

obtain the grant value range corresponding to the determined first sending manner; and
according to the grant value range and the quantized value that is used for the scheduling grant, use the maximum quantized value in the grant value range as the second grant value $$\left(\frac{\beta_{ed}}{\beta_c}\right)_{single};$$

wherein, k is a value greater than zero that represents the obtained stream signal to noise ratio;

$$\left(\frac{\beta_{ed}}{\beta_c}\right)_{dual}$$

represents a scheduling grant value of a dual stream, wherein $\beta_{ed}$ represents the power of the E-DPDCH or the power of the S-E-DPDCH in the dual-stream sending manner, and $\beta_c$ represents power of the DPCCH;

$$\left(\frac{\beta_{ec,p}}{\beta_c}\right)_{dual}$$

represents a power bias of a primary stream control channel E-DPCCH in a dual-stream condition, wherein $\beta_{ec,p}$ represents a power of the primary stream control channel E-DPCCH;

$$\left(\frac{\beta_{sc}}{\beta_c}\right)_{dual}$$

represents a power bias of a secondary pilot channel in the dual-stream condition, wherein $\beta_{sc}$ represents power of a secondary pilot channel secondary DPCCH (S-DPCCH);

$$\left(\frac{\beta_{ec,s}}{\beta_c}\right)_{dual}$$

represents a power bias of a secondary stream control channel S-E-DPCCH in the dual-stream condition, wherein $\beta_{ec,s}$ represents power of the secondary stream control channel S-E-DPCCH;

$$\left(\frac{\beta_{ec,p}}{\beta_c}\right)_{single}$$

represents a power bias of the primary stream control channel E-DPCCH in a single-stream condition; and $$\left(\frac{\beta_{sc}}{\beta_c}\right)_{single}$$

represents a power bias of the secondary pilot channel in the single-stream condition.

17. The UE according to claim 1, wherein the instructions to determine the first sending manner include instructions to determine that the first sending manner adopted by the UE is the dual-stream sending manner, wherein the S-E-DPCCH is sent on the secondary stream, and wherein a second sending manner corresponding to the first grant value is the single-stream sending manner; and
wherein the instructions to obtain the second grant value corresponding to the first sending manner includes instructions to:
according to $$\text{Grant} \geq \left(\left(\frac{\beta_{ed}}{\beta_c}\right)_{single} - k*\frac{\beta_{ec}}{\beta_c}\right)/(1+k),$$

obtain the grant value range corresponding to the determined first sending manner; and
according to the grant value range and the quantized value that is used for the scheduling grant, use a minimum quantized value in the grant value range as the second grant value $$\left(\frac{\beta_{ed}}{\beta_c}\right)_{dual};$$

wherein, Grant represents the grant value range, and k is a value greater than zero that represents the obtained stream signal to noise ratio;

$$\left(\frac{\beta_{ed}}{\beta_c}\right)_{single}$$

represents the first grant value, wherein $\beta_{ed}$ represents the power of the E-DPDCH in the single-stream sending manner, and $\beta_c$ represents the power of the DPCCH; and $$\frac{\beta_{ec}}{\beta_c}$$

represents the power bias of the E-DPCCH, wherein $\beta_{ec}$ represents power of the E-DPCCH, and $\beta_c$ represents the power of the DPCCH.

18. The UE according to claim 11, wherein the instructions to determine the first sending manner include instructions to determine that the first sending manner adopted by the UE is the dual-stream sending manner, wherein the S-E-DPCCH is sent on the primary stream, and wherein the second sending manner corresponding to the first grant value is the single-stream sending manner; and wherein the instructions to obtain the second grant value corresponding to the first sending manner includes instructions to:

according to $$\text{Grant} \geq \left(\left(\frac{\beta_{ed}}{\beta_c}\right)_{single} - \frac{\beta_{ec}}{\beta_c}\right)\bigg/(1+k),$$

obtain the grant value range corresponding to the determined first sending manner; and according to the grant value range and the quantized value that is used for the scheduling grant, use a minimum quantized value in the grant value range as the second grant value $$\left(\frac{\beta_{ed}}{\beta_c}\right)_{dual};$$

wherein, Grant represents the grant value range, and k is a value greater than zero that represents the obtained stream signal to noise ratio;

$$\left(\frac{\beta_{ed}}{\beta_c}\right)_{single}$$

represents the first grant value, wherein $\beta_{ed}$ represents the power of the E-DPDCH in the single-stream sending manner, and $\beta_c$ represents the power of the DPCCH; and $$\frac{\beta_{ec}}{\beta_c}$$

represents the power bias of the E-DPCCH, wherein $\beta_{ec}$ represents power of the E-DPCCH, and $\beta_c$ represents the power of the DPCCH.

\* \* \* \* \*